United States Patent [19]

Maier

[11] Patent Number: 4,667,279
[45] Date of Patent: May 19, 1987

[54] TRANSFORMER COUPLED PARD BUCKER FOR DC POWER SUPPLIES

[75] Inventor: Craig P. Maier, Verona, N.J.

[73] Assignee: Hewlett-Packard Company, Palo Alto, Calif.

[21] Appl. No.: 847,083

[22] Filed: Apr. 1, 1986

[51] Int. Cl.[4] .............................................. H02M 1/15
[52] U.S. Cl. ........................................ 363/46; 363/90
[58] Field of Search ...................... 363/39, 75, 82, 90, 363/46, 126

[56] References Cited

U.S. PATENT DOCUMENTS 4,594,648  6/1986  Gallios ................................. 363/46

Primary Examiner—Peter S. Wong
Assistant Examiner—Judson H. Jones
Attorney, Agent, or Firm—Donald N. Timbie

[57] ABSTRACT

A noise reduction circuit for a DC power supply in which the input of a high pass filter is coupled to the output circuit of the supply so as to receive a noise signal, the output of the high pass filter is coupled to the primary winding of a transformer via an amplifier, and the secondary winding of the transformer is coupled to the output circuit of the supply so as to reduce the noise therein.

3 Claims, 6 Drawing Figures

TRANSFORMER COUPLED PARD BUCKER FOR DC POWER SUPPLIES

BACKGROUND OF THE INVENTION

All DC power supplies produce noise at their output. The noise can be random, periodic or a combination of the two. In a phase-controlled power supply, the dominant noise is periodic and a multiple of the line frequency; and in a switching supply, one grouping of noise terms is the switching frequency or twice that frequency. In both designs, noise is attenuated by filters, usually of the LC type, in which the components tend to be large and expensive. In power supplies regulated by varying the conductance of a series pass transistor, most of the noise is eliminated by the rheostat action, but the losses in the transistor significantly reduce efficiency. An increase in efficiency and good noise rejection have been achieved by a hybrid supply in which a phase control or switcher is used to maintain a constant low voltage across a series pass transistor that is in the control loop of the hybrid supply; but because the series pass transistor is operated in a linear mode, it still dissipates considerable energy.

BRIEF SUMMARY OF THE INVENTION

In accordance with this invention, good noise rejection is attained without significant dissipation of energy. The noise generated within a DC power supply is reduced by coupling a high pass filter to the output circuit of the supply so as to produce a signal corresponding to the noise, applying the signal so derived to the primary winding of a transformer via an amplifier, and connecting the secondary winding to the output circuit so as to tend to cancel any noise therein. When the supply is optimized for operation in a constant voltage mode, the input of the high pass filter is connected across the output circuit, and the secondary winding of the transformer is connected in series with it so as to be traversed by load current. In some designs, an auto-transformer may be appropriate. The amplifier acts as a voltage amplifier and the phasing is such that the voltage appearing across the secondary winding is out of phase with the noise voltage so that cancellation can occur.

The high pass filter can be connected to either side of the secondary winding but, if the connection is on the output side, the gain of the amplifier will have to approach infinity.

When the supply is optimized for operation in a constant current mode, the input of the high pass filter is connected across a current sensing resistor through which the load current passes, and the secondary winding is connected across the output circuit so as to be in shunt with the load. The amplifier acts to vary the current in the secondary circuit in such phase with respect to the noise current flowing toward the load as to reduce the noise current from flowing in the load.

In order that the changes in noise cancellation voltage or current thus introduced in the output circuit may have the correct amplitude, the gain of the amplifier is set at an appropriate value; and if the cancellation voltage or current do not have the proper phase, a phase compensation circuit is coupled to the amplifier.

DETAILED DESCRIPTION OF THE INVENTION

Figure 1:
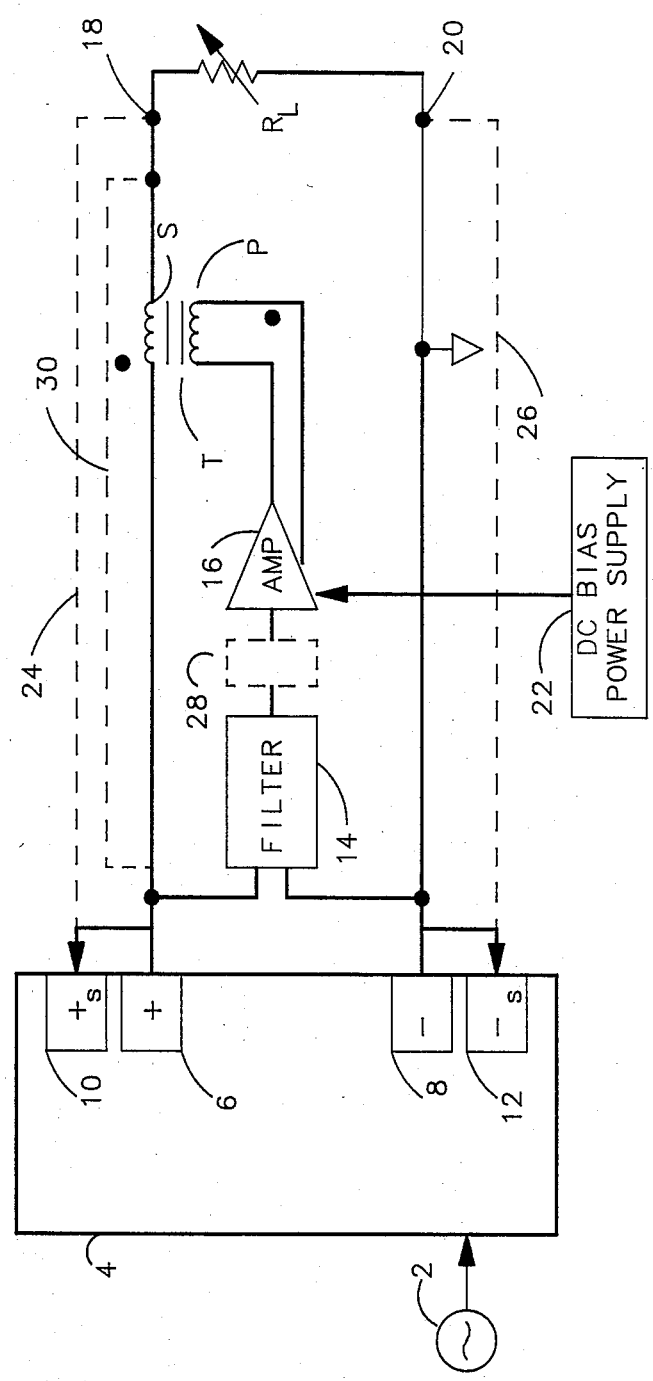
FIG. 1 illustrates a way of incorporating this invention in a DC power supply that is optimized for operation in a constant voltage mode.

In FIG. 1, a source 2 of line voltage is connected to a DC power supply 4 having respective positive and negative power output points 6 and 8 and respective positive and negative sensing inputs 10 and 12. The power supply 4 may be regulated in any manner, but its design is understood to be optimized for constant voltage operation therefore exhibiting a low impedance when operating in a constant current mode. This is caused by the fact that a large capacitor is generally connected between the power output points. In the latter mode, an internal current sensing resistor, not shown, is inserted ahead of the capacitor so as to provide the supply with an indication of the average load current. In this particular illustration, the input of a high pass filter 14 is connected between the power output points 6 and 8 and its output is connected via an amplifier 16 so as to energize the primary winding P of a transformer T. The secondary winding S is connected between the power output point 6 and one output terminal 18 so as to be in series with the output circuit and is poled with respect to the primary winding P as indicated by the dots so that any noise voltage coupled thereto from the primary winding P is out of phase with any noise voltage at the power output point 6. A load $R_L$ is connected between the output terminal 18 and an output terminal 20 that is connected to the grounded negative power output 8. Any suitable bias power supply 22 is coupled so as to provide suitable operating potentials to the amplifier 16.

In this particular illustration, the sensing inputs are connected to the same points as the input of the high pass filter 14 so that the invented noise cancellation circuit is outside of the main control loop for the DC power supply 4; but the sensing inputs could be respectively connected to the output terminals 18 and 20 as indicated by dashed lines 24 and 26, in which event the invented noise cancellation circuit would be within the main control loop.

Once the gain of the amplifier 16 is set so that the amplitude of the noise voltage induced across the secondary winding S is the same as the amplitude of the noise voltage between the power outputs 6 and 8, cancellation will occur even though the amplitude of the line voltage from the source 2 varies.

Should the phase of the noise voltage induced across the secondary winding S not be 180° out of phase with all the noise component frequencies, a suitable phase compensation network 28, shown in dashed lines, can be coupled between the high pass filter 14 and the amplifier 16.

In FIG. 1, one input of the high pass filter 14 is connected on the power supply side of the secondary winding S, but as indicated by a dashed line 30, it could be connected on the output side of the secondary winding S. This requires a large gain bandwidth product, but no calibration is required.

When the power supply 4 of FIG. 1 operates in a constant current mode, the circuit operates in the same manner because the noise source resembles a voltage source more than a current source.

Figure 2:
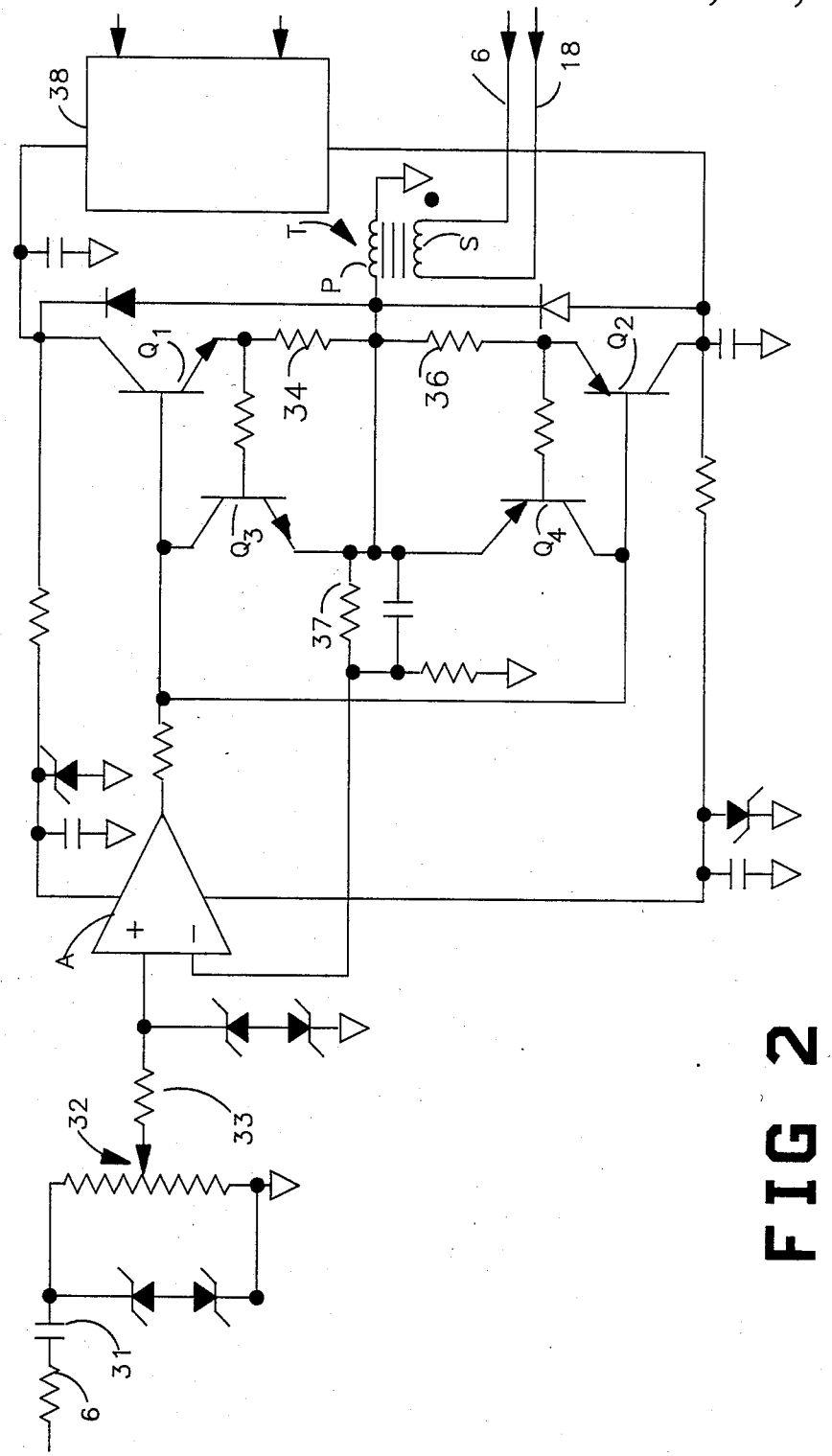
FIG. 2 is a schematic diagram of a noise reduction circuit that can be used in FIG. 1.

FIG. 2 is a schematic drawing of a circuit that can be used in FIG. 1. The essential parts of the circuit are as follows. A capacitor 31 and a potentiometer 32 are connected in series from the positive power output point 6 of the power supply 4 to ground so as to form a high pass filter. The movable tap of the potentiometer 32 is connected via a resistor 33 to the non-inverting input of a operational amplifier A, and the output of the amplifier A is connected to the bases of a complementary pair of power transistors $Q_1$ and $Q_2$. Resistors 34 and 36 are connected in series between the emitter of $Q_1$ and the emitter of a PNP transistor $Q_2$, and the inverting input of the amplifier A is coupled to the junction of the resistors 34 and 36 via a resistor 37. The gain of the amplifier A is determined by the ratio of the resistances of the resistors 37 and 33. Operating potentials are supplied to the collectors of the transistors $Q_1$ and $Q_2$ and to the amplifier A by a power supply 38. Transistors $Q_3$ and $Q_4$ are coupled as shown for the purpose of limiting the current in $Q_1$ and $Q_2$.

The primary winding P of the transformer T is connected between the junction of the resistors 34 and 36 and ground. One end of the secondary winding S is connected to the power output point 6 and the other end is connected to the output terminal 18.

Because of the capacitor 31, the desired DC output voltage has no effect on the noise reduction circuit, so that only AC noise at the power output point 6 will cause the transistors $Q_1$ and $Q_2$, which operate in the Class B mode, to conduct alternately so as to produce an AC voltage across the primary winding P that is shaped like the noise voltage. Generally, the transformer T is the step-down type so as to reduce the resistance of the secondary winding S. The potentiometer 32 is adjusted so that the amplitude of the voltage across the secondary winding S is the same as the amplitude of the noise voltage at the power output point 6 so that cancellation occurs.

The noise reduction circuit of the invention has been described with the secondary winding S in the positive voltage output line between the positive power output point 6 and the positive output terminal 18, but as is well understood by those skilled in the art, it could be connected in the negative line between the negative power output point 8 and the negative output terminal 20.

As previously indicated by dashed lines 24 and 26 of FIG. 1, the high pass filter 16 could be connected between the output terminals 18 and 20, but from a theoretical point of view, this would require the amplifier 14, which is designated by "A" in FIG. 2, to have infinite gain in order to achieve similar noise rejection.

Figure 3:
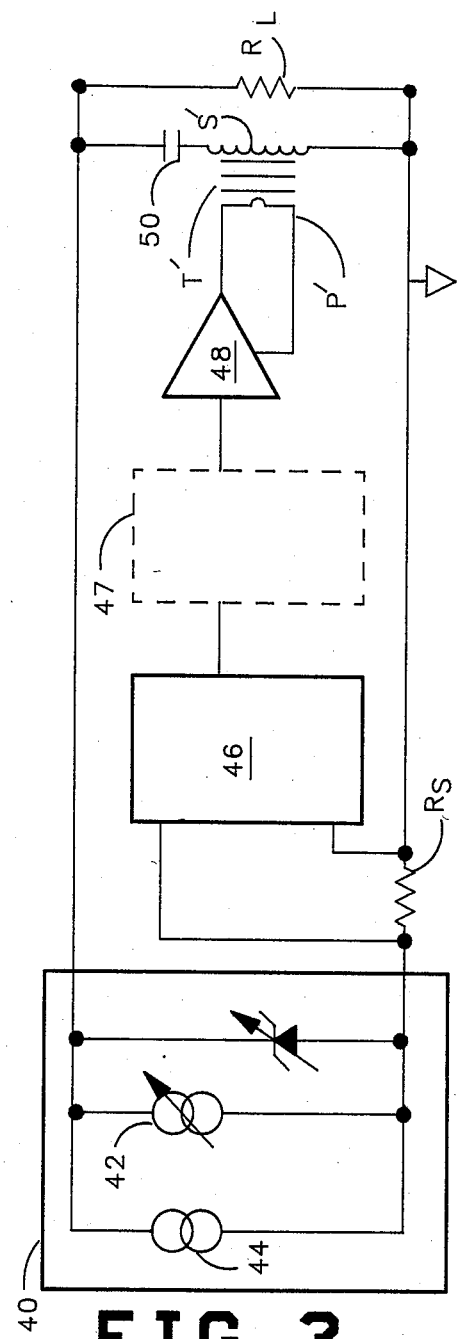
FIG. 3 illustrates one way of incorporating the invention into a DC power supply that is optimized for constant current operation.

Reference is now made to FIG. 3 for a description of how the noise reduction circuit of the invention can be used in a power supply 40 that is optimized for constant current operation so that it has a source 42 of output current having nearly infinite impedance and a source 44 of noise current also having nearly infinite impedance. If the invented noise reduction circuit were connected as previously shown, these high impedances would prevent the secondary winding S from producing enough current to cancel the noise current in any reasonable manner. Therefore, a high pass filter 46 is connected across a current sensing resistor $R_S$ used for current regulation and is coupled to an amplifier 48 that is coupled to the primary winding P' of a transformer T'. The secondary winding S' is connected in series with a DC blocking capacitor 50 between output terminals 18' and 20' so as to be in shunt with a load $R_L$. A phase compensation circuit 47 can be inserted between the output of the high pass filter 46 and the input of the amplifier 48 as required.

The noise reduction circuit of FIG. 3 operates as a transconductance device so as to reduce noise current $I_n$ in the load $R_L$.

Figure 4:
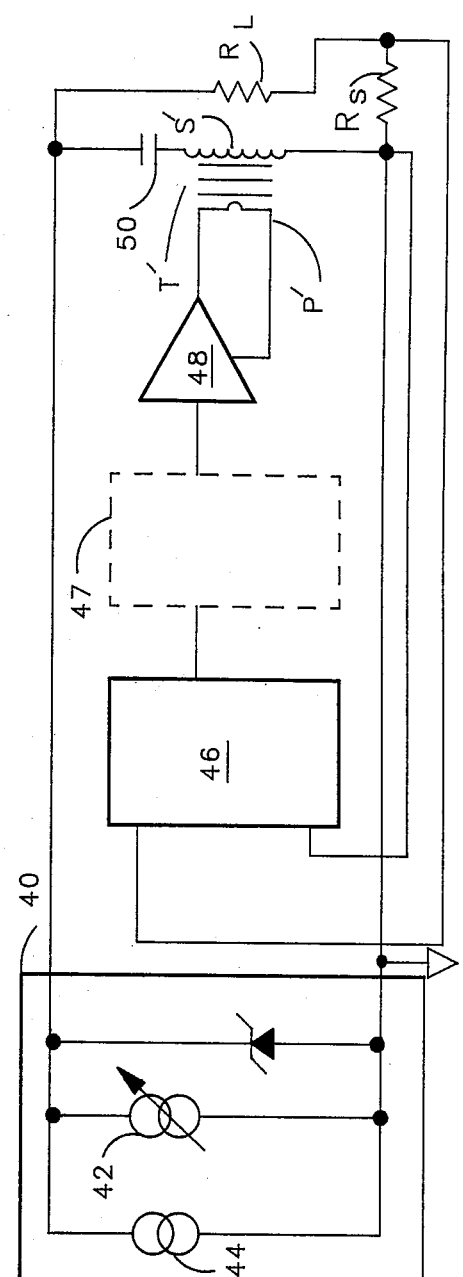
FIG. 4 illustrates a way of incorporating a noise reduction circuit of this invention into a power supply that is optimized for constant current operation so as to reduce noise when the supply is operated in a constant current mode but also provides some rejection in the voltage limit mode.

If a power supply that is optimized for constant current operation is to utilize the invented noise reduction circuit when it is operating in a constant voltage mode, the embodiment shown in FIG. 4 would be preferred. Components similar to those in FIG. 3 are designated in the same manner. The essential difference is that the current sensing resistor $R_S$ is connected in series with the load $R_L$. This requires an amplifier with a much higher gain bandwidth product than that of FIG. 3.

Figure 5:
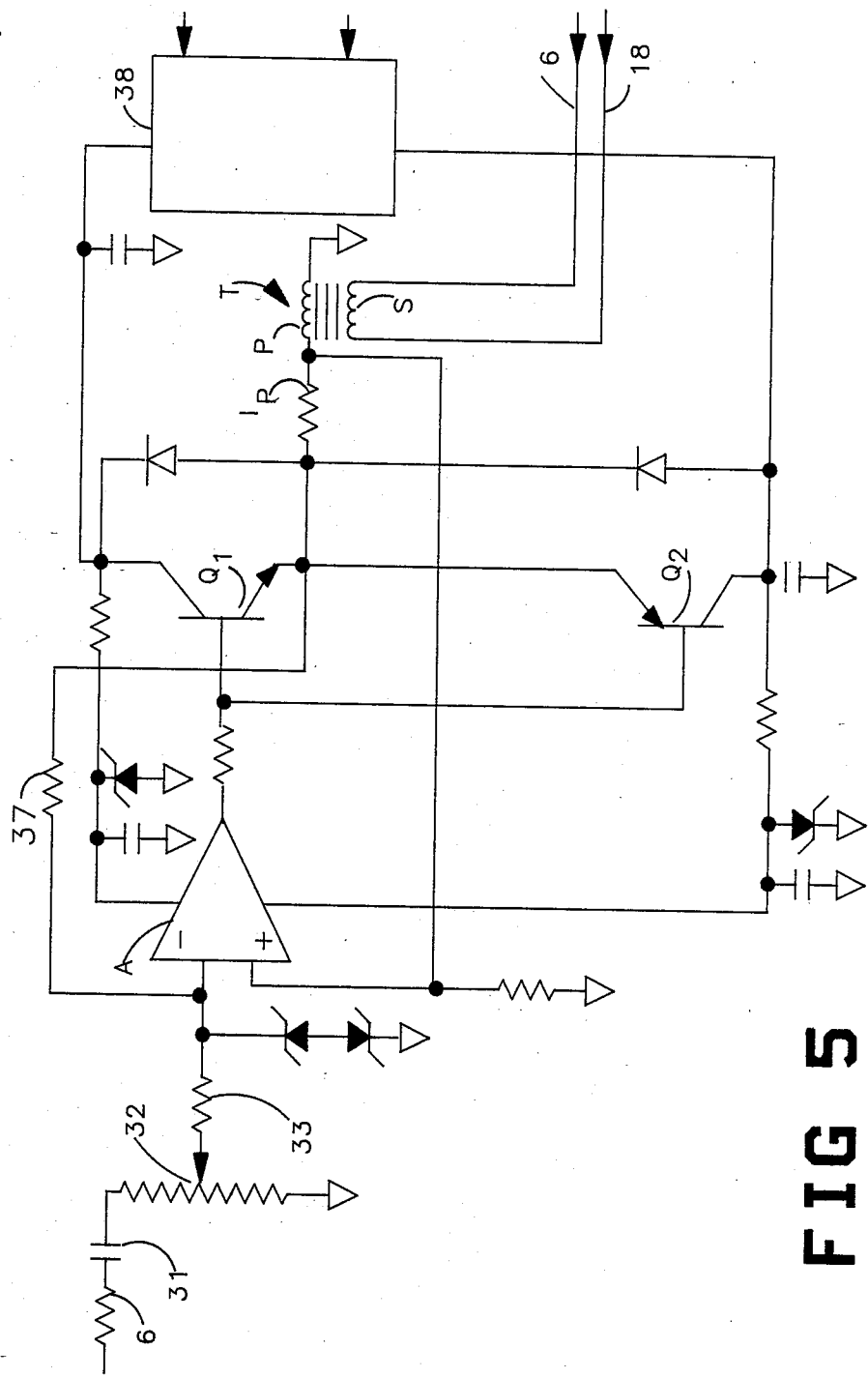
FIG. 5 is a schematic diagram of a noise reduction circuit for use in FIGS. 3 and 4.

FIG. 5 schematically illustrates the noise reduction circuit that would be used in FIGS. 3 and 4 to provide the required transconductance, i.e., a change in current corresponding to a change in noise voltage developed across a current sensing resistor. Since it is similar to the circuit shown in FIG. 2, corresponding components are designated in the same manner. The differences are as follows. The output of the potentiometer 32 is now connected to the inverting input of the operational amplifier A, a current sensing resistor $I_P$ is connected in series with the primary winding P of the transformer T, and a connection is made between the junction of $I_P$ and P and the non-inverting input of the amplifier A. The junction of the emitters of $Q_1$ and $Q_2$ is connected via the resistor 37 to the inverting input of the amplifier A. The current limiting transistors $Q_3$ and $Q_4$ can be omitted.

When the circuit of FIG. 4 is used, the gain of the amplifier A will have to be great because the current in $R_S$ is not $I_n$ but equal to the portion of $I_n$ that flows through $R_L$ after the noise current therethrough has been reduced by the invented circuit. For this reason, it might be desirable to use the circuit of FIG. 4 if constant voltage operation is relatively unimportant.

Figure 6:
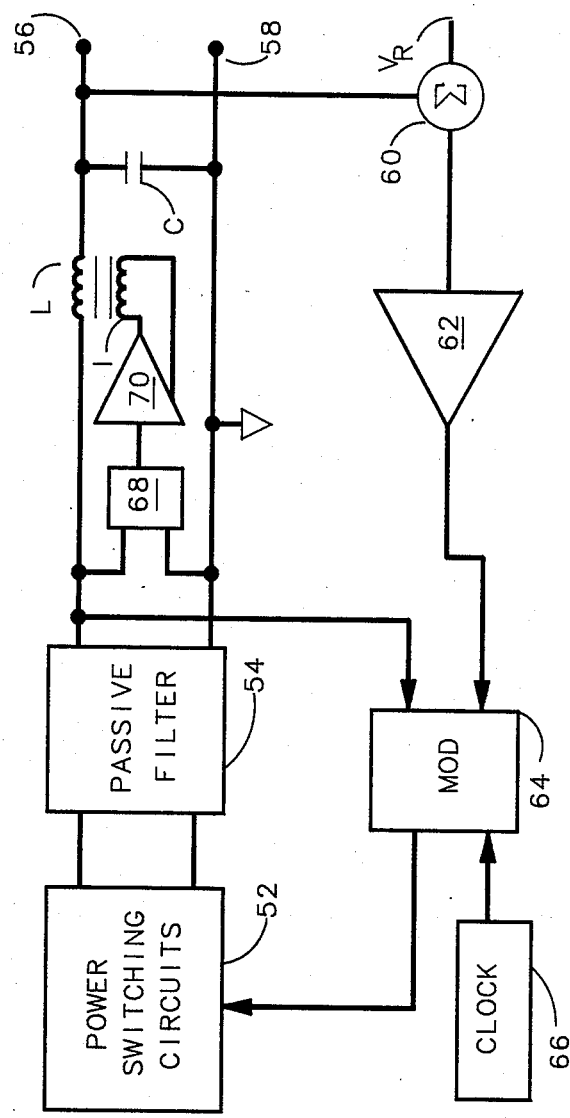
FIG. 6 illustrates a way of incorporating the noise reduction circuit of this invention in a switching or phase control power supply so as to reduce the cost of the magnetics involved.

Reference is now made to FIG. 6 for a description of a way in which the noise reduction circuit can be incorporated into a switching or phase controlled power supply in such manner as to reduce the cost and/or size of magnetics required. The switching circuits, rectifier and transformer are not shown, but are included in block 52. The DC voltage thus provided is coupled to a passive filter 54, and its output is coupled to a low pass filter comprised of an inductor L through which load current passes and the usual large charging capacitor C that is connected between power output points 56 and 58 that can also serve as output terminals. The voltage at the output point 56 is applied to a summer 60 so as to derive an error voltage equal to the difference between the voltage at the output point 56 and a reference voltage $V_R$. The error voltage is amplified in an amplifier 62 and applied to a pulse width or phase modulation circuit 64 that is coupled to the switching circuits in the block 52 so as to vary the times during which the switches are closed as is required to regulate the DC voltage between the output points 56 and 58. The DC voltage at the output of the passive filter 54 is also applied to the modulator 64 in what is known as a "limit cycle loop". Timing of the switching is determined by a clock 66.

The noise reduction circuit of this invention could be connected to the power output points 56 and 58 in the same manner as it was coupled to the power output points 6 and 8 of FIG. 1, but costs can be reduced by connecting the input of a high pass filter 68 across the output of the passive filter 54 and connecting the output of the high pass filter 68 to an amplifier 70. The output of the amplifier 70 is coupled to an inductor 1 that is coupled to the filter inductor L so as to form a transformer. Operation of the circuit is the same as in FIG. 1.

What is claimed is:

1. A DC power supply in which noise appears in an output thereof, comprising means including a high pass filter coupled to said output for deriving a signal corresponding to the noise at said output, a transformer having primary and secondary windings, means including an amplifier for coupling said primary winding to said means for deriving a signal corresponding to the noise, and means for coupling said secondary winding to said output so as to reduce the noise therein.

2. A DC power supply as set forth in claim 1 having means for producing a regulated direct current voltage across said output, said high pass filter having an input coupled across said output circuit and an output coupled to said amplifier, and wherein said last means connects said secondary winding to said output to vary the voltage appearing thereacross in accordance with the noise.

3. A DC power supply as set forth in claim 1 having means for providing a regulated direct current at said output when a load is connected thereacross, a resistor connected to said output so as to be traversed by any regulated load current, said high pass filter having an input coupled across said resistor, and said last means connecting said secondary winding across said output.

* * * * *